No. 661,475. Patented Nov. 6, 1900.
G. A. LOWRY.
BALE OF FIBROUS MATERIAL.
(Application filed Jan. 29, 1897.)
(No Model.)

Witnesses
Wm. F. Henning
D. Hutchison

Inventor
George A. Lowry
by Brown & Darby
Attys.

UNITED STATES PATENT OFFICE.

GEORGE A. LOWRY, OF CHICAGO, ILLINOIS, ASSIGNOR, BY DIRECT AND MESNE ASSIGNMENTS, TO THE PLANTERS COMPRESS COMPANY, OF WEST VIRGINIA.

BALE OF FIBROUS MATERIAL.

SPECIFICATION forming part of Letters Patent No. 661,475, dated November 6, 1900.

Application filed January 29, 1897. Serial No. 621,203. (No model.)

*To all whom it may concern:*

Be it known that I, GEORGE A. LOWRY, a citizen of the United States, residing at Chicago, in the county of Cook and State of Illinois, have invented a new and useful Bale of Fibrous Material, of which the following is a specification.

This invention relates to a new article of manufacture which may be designated as a "bale of fibrous material."

The object of the invention is to produce a bale of compressed fibrous material which will occupy a very small space compared with its weight and at the same time permit a ready and facile withdrawal of a portion of the bale.

The invention consists, substantially, in the construction which will be hereinafter described, and more particularly pointed out in the claims.

Like letters refer to similar parts in both figures of the drawings.

Figure 1:
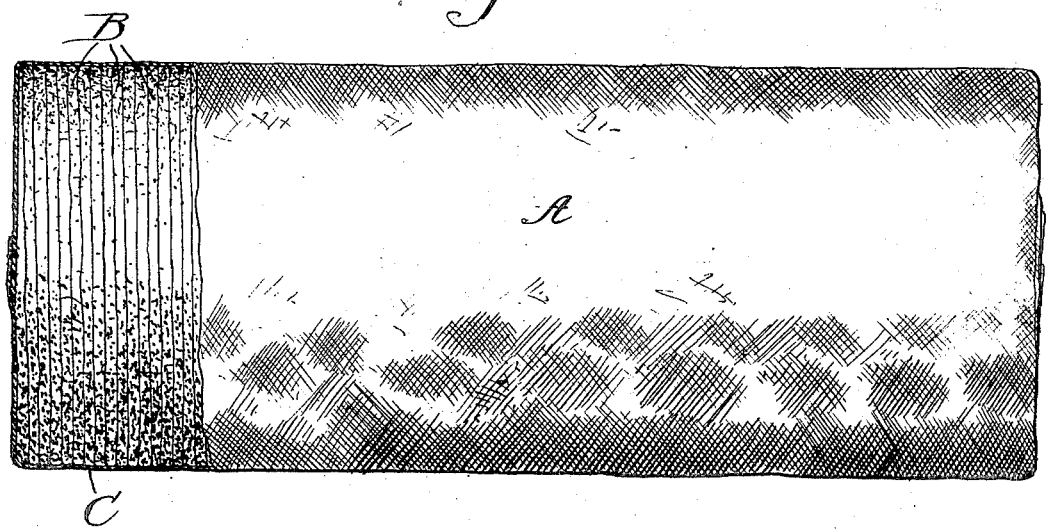
Figure 2:
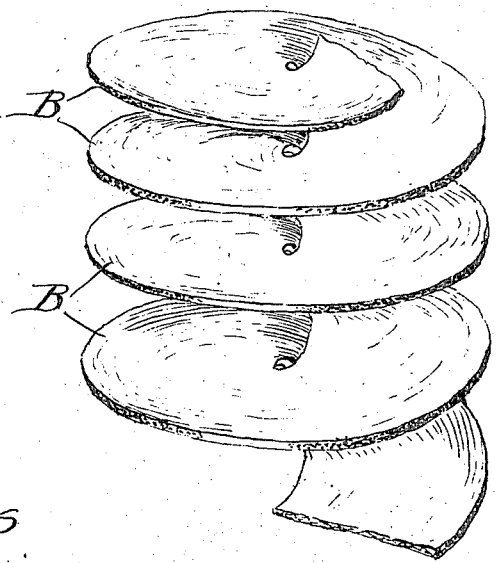

Figure 1 illustrates a side elevation of a bale secured in its compressed condition and in its cover, with a small portion broken away and in section. Fig. 2 illustrates in vertical elevation a view of a portion of a bale which has been withdrawn for use or sampling purposes.

It is well understood in the present age that fibrous materials of various sorts or kinds—such as cotton, hemp, hay, flax, and tow, and various other substances—are for purposes of transportation and storage compressed, so as to very considerably reduce their original volume when packed in bulk. This extreme compression which is given such fibrous materials in order to form them into a bale has disadvantages in that a portion of the material cannot be readily removed either for use or for sampling purposes, and this is especially true with bales of the material made under more recent processes, in which the degree of compression has been greatly augmented. So much difficulty has been experienced in sampling the bales compressed under recent methods that special machines have been invented and produced for obtaining samples from the bale while in process of compression. Samples are attached to the outside of the bale as a guarantee of its texture. Again, according to recent methods the bales are compressed by a process of winding, and so tightly is this done that it has been found difficult, if not impracticable, to unwind them by hand, and accordingly special machines have been devised for reversing the winding operation, and thereby obtaining a portion or all of the material in condition to be used.

In the patents heretofore obtained by me, Nos. 581,600 and 581,601, I describe a machine which subjected the fibrous material to a pressure which ultimately produced a bale having a high degree of compression and such a density as to make it practically impenetrable for sampling purposes if such material had not a particular arrangement which it is the province of this specification to describe and cover.

The bale of cotton, wool, hemp, or other fibrous material which I produce is composed of a number of approximately parallel layers of compressed material joined so as to form a compressed spiral, which when extended will have the appearance illustrated in Fig. 2 of the drawings and when compressed will appear more like what is illustrated in Fig. 1 of the drawings. These approximately parallel but joined layers adhere closely and naturally in the bale; but the portion of the bale desired for use may be readily removed by taking the upper end in hand and pulling layer after layer apart at their edges, each succeeding layer being thus lifted by the bond or continuous piece connecting it with the upper layer. In practice it has been found that this can be readily done by hand and the material will assume the form (shown in Fig. 2) of a continuous spiral. Again; it is unnecessary with this construction to preserve a sample and attach it to the outside of the bale, because a sample can be readily obtained from any portion of the bale desired by inserting the instrument between the layers and drawing out a portion of the spiral sufficient for the purposes of the sample. It is also evident that the bale may be sampled at either end by lifting a portion of the top layer or bottom layer, as the case may be, from between the wires. In this respect the present bale of fibrous material differs, essentially, from those bales made by winding bodies from the center toward the outside of the bale or by simply compressing a mass of material with no definite line of separation, for in these two instances the density of the material is such that it is impracticable to penetrate the interior, while in my bale, even though the material is more dense, a separation between the edges of the layers can be readily made. In practice I have found the best way of producing this bale is by a machine substantially like that described and illustrated in my previous patents above referred to. A chamber is loosely filled with the material desired to be compressed and covered by a cap, through which is formed an inclined opening or openings, this cap being fastened to a stationary frame and the chamber having mechanism for revolving it. Additional material is then introduced into the chamber through the opening or openings in the cap and the chamber revolved, which has the effect of not only drawing in the additional material, but of highly compressing the layer of material against the under side of the cap as it is being introduced, and thereby expelling the air from the particles of such material. This operation is continued as long as the material is supplied, and consequently the highly-compressed layers thus introduced into the chamber are superposed in the form of a continuous spiral, the coils of which are flattened and are laid upon each other under pressure, so as to also exclude the air from between the layers or coils. Of course it will be understood that, as described in the patents above referred to, high resistance to the passage of the material through the chamber is afforded, which necessarily has the effect of causing the material in the chamber to exert a strong pressure against the material or layers entering the chamber, and thus compress them.

In the drawings, A designates the finished bale in its compressed state, and B the layers of such material, which are all joined together because the layers make a complete spiral.

C designates any suitable cover which is placed upon the compressed bale, which cover is of the usual construction. This bale has a number of advantages, some of which will be now specified. It is readily sampled at any point, as above described. A portion of the bale may be removed with facility by hand by simply breaking off a few layers. After the confining wires or cords are cut the bale expands quickly and spontaneously and does not have to be torn apart with pickers or other devices, and thus a considerable saving in time and money is gained for the user of the cotton or other material. The bale is of almost uniform density from periphery to center. The bale is hollow at the center, and it is formed of continuous spiral flakes or layers, so that any desired portion of the bale may be readily and accurately detached, and when relieved of its tension it merely expands and retains its spiral arrangement, making it very convenient to handle. The bale, furthermore, being formed of layers from each of which the air is expressed as compressed, and such layers being superposed upon each other under compression, so as to thereby exclude the air from between the layers, and the bale fastened, secured, or covered in this condition, is, so to speak, "hermetically sealed"—that is, the air is excluded and prevented from reëntering the bale, which tends to preserve the material in the original condition in which it is baled for a considerable period of time.

It is manifest that variations or modifications may be made in the details of the arrangement shown and described without departing from the principle of construction set forth.

What I claim, and desire to secure by Letters Patent, is—

1. A bale of highly-compressed, fibrous material, composed of a continuous spiral with the convolutions flattened and resting one upon the other; substantially as and for the purpose set forth.

2. A bale of highly-compressed, fibrous material, composed of a continuous spiral with the convolutions resting one upon the other and leaving a longitudinal, central opening through such bale, substantially as and for the purpose set forth.

3. A bale of fibrous material composed of highly-compressed layers superposed one upon the other in the form of a continuous spiral; substantially as and for the purpose set forth.

4. As a new article of manufacture, a bale composed of a series of superposed layers, each of which is highly compressed so as to express the air from the particles thereof, and such layers flattened and resting one upon the other under compression so as to exclude the air from between the layers; substantially as and for the purpose set forth.

5. As a new article of manufacture, a bale composed of a series of superposed layers, each of which layers is highly compressed so as to express the air therefrom, and all of which layers are superposed one above the other under compression so as to exclude the air from between such layers, and means for retaining the bale in this compressed condition; substantially as and for the purpose set forth.

6. As a new article of manufacture, a highly-compressed bale of fibrous material composed of a continuous spiral, each of the convolutions of which is individually highly-compressed, and all of the convolutions of which are flattened and superposed one above the other under compression, and means for retaining the bale in this condition; substantially as and for the purpose set forth.

In witness whereof I have hereunto set my hand, this 27th day of January. 1897, in the presence of the subscribing witnesses.

GEORGE A. LOWRY.

Attest:
 FRANK T. BROWN,
 STANTON HUTCHISON.